United States Patent [19]
Cullen et al.

[11] 3,744,853
[45] July 10, 1973

[54] FLUID PRESSURE-OPERATED BRAKING SYSTEMS FOR VEHICLES

[75] Inventors: John Leslie Cullen; Alexander Frank Potter, both of Stratford-upon-Avon, Warwickshire, England

[73] Assignee: Girling Limited, Tynsley, England

[22] Filed: May 3, 1971

[21] Appl. No.: 139,747

[30] Foreign Application Priority Data
May 12, 1970   Great Britain............... 22,759/70

[52] U.S. Cl............................ 303/21 F, 188/181 A
[51] Int. Cl............................................. B60t 8/12
[58] Field of Search.................. 303/21 F, 21 CG, 303/24, 61–63, 68–69, 40; 188/181 A

[56] References Cited
UNITED STATES PATENTS

| | | | |
|---|---|---|---|
| 3,608,982 | 9/1971 | Inada et al. | 303/21 F |
| 3,401,986 | 9/1968 | Walker et al. | 188/181 A |
| 3,586,388 | 6/1971 | Stelzer | 188/181 A |
| 3,401,982 | 9/1968 | Walker et al. | 303/21 F |

*Primary Examiner*—Duane A. Reger
*Attorney*—Imirie & Smiley

[57] ABSTRACT

A booster-assisted pressure-operated braking system incorporates a normally open control valve assembly through which fluid under pressure is supplied to the booster to actuate a wheel brake actuator. The control valve assembly is adapted to close in response to a signal received from means responsive to the deceleration of a braked wheel and subsequently cause the pressure applied to the booster to be relieved.

18 Claims, 3 Drawing Figures

INVENTORS
JOHN L. CULLEN
ALEXANDER F. POTTER

FLUID PRESSURE-OPERATED BRAKING SYSTEMS FOR VEHICLES

This invention relates to fluid pressure-operated braking systems for vehicles of the kind in which at least one actuator of a wheel brake is actuated by a supply of high pressure fluid from a valve under the control of a booster incorporating a wall movable in a housing in response to differential fluid pressures applied to chambers in the housing on opposite sides of the movable wall, and deceleration responsive means are incorporated for regulating the braking pressure applied to that brake actuator when the deceleration to which a wheel is subjected exceeds a predetermined value due to the application of the brake operated by the brake actuator.

According to our invention a fluid pressure-operated braking system of the kind set forth incorporates a control valve assembly which is normally open to permit fluid under pressure to be supplied to a chamber in the housing on one side of the movable wall, whereby the movable wall is moved in one direction to actuate the actuator of the wheel brake, and the control valve assembly is adapted to close in response to a signal received from the deceleration responsive means and cut-off the supply of fluid to the actuator, placing the chamber on the opposite side of the movable wall in communication with the supply of fluid under pressure whereby the movable wall is restored to a balanced position and the pressure-applied to the booster is relieved.

When the deceleration of the braked wheel decreases to a value equal to or slightly less than the said predetermined value the decleration responsive means are operative to open the control valve assembly whereby the braking effort applied to the wheel is restored.

Preferably, there is interposed in the line between a supply of fluid under pressure and the control valve assembly a restrictor valve which is normally open to allow fluid under pressure to be supplied to the control valve assembly. When the deceleration of the braked wheel exceeds a predetermined value, the restrictor valve is operative to restrict progressively communication between the supply of fluid under pressure and the control valve assembly.

One embodiment of our invention is illustrated in the accompanying drawings in which.

Figure 1:
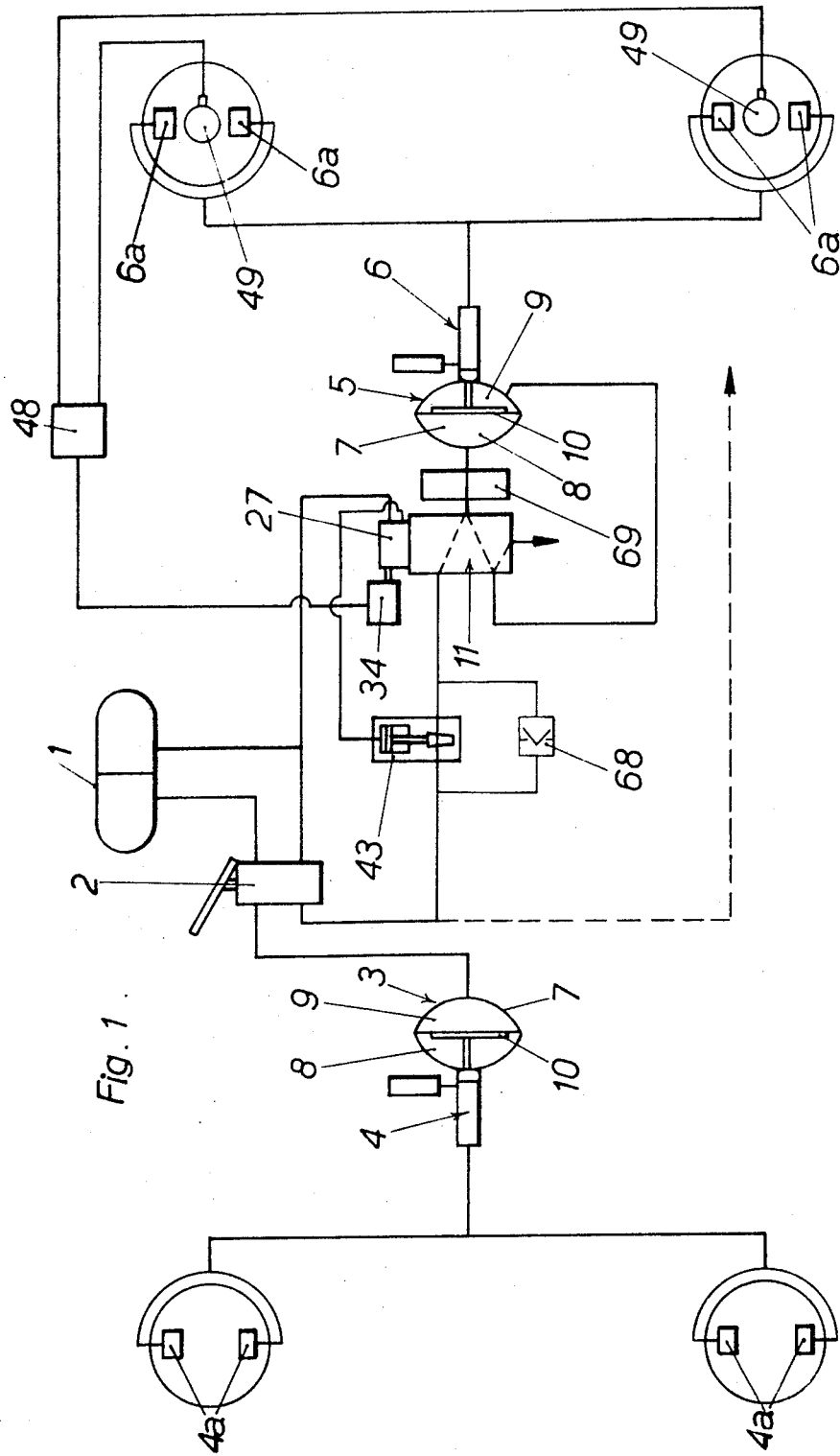
FIG. 1 is a layout of a braking system incorporating our invention.

In the braking system illustrated in FIG. 1 of the accompanying drawings 1 is a source of air under pressure, suitably a reservoir, from which air under the control of a treadle valve 2 is supplied to a booster 3 of a combined booster and hydraulic master cylinder assembly 4 for actuating the slave cylinders 4a of brakes on the front wheels of a vehicle and from which air is supplied to a booster 5 of a combined booster and hydraulic master cylinder 6 for actuating slave cylinders 6a of brakes on the rear wheels of the vehicle. Each booster 3 and 5 is of the air suspended type and comprises a casing 7 which is divided into two separate chambers 8 and 9 on opposite sides of a movable wall 10 and, when air under pressure is admitted to one of the chambers, the movable wall is advanced in the casing to actuate the piston of the master cylinder with which that booster is combined, whereby hydraulic fluid under pressure is supplied to the appropriate slave cylinders of wheel brakes from the master cylinders.

Figure 2:
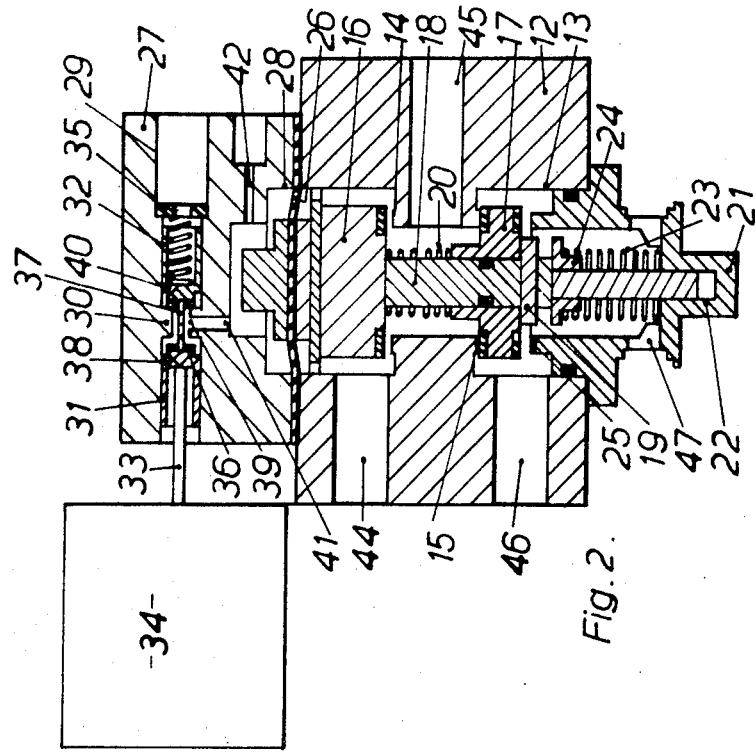
FIG. 2 is a section through a control valve assembly incorporated in the brake system shown in FIG. 1.

In accordance with our invention there is interposed between the treadle valve 2 and the booster 5 a control valve assembly 11 which is illustrated in detail in FIG. 2. The control valve assembly 11 comprises a main housing 12 provided with a central through-bore 13 which, at intermediate points in its length, is formed with a pair of opposed axially spaced annular seatings 14 and 15 with which are adapted to engage alternatively a pair of valve members 16 and 17 carried by a stem 18 which extends axially through the bore 13. The valve member 16 is fixedly secured to the stem 18 but the valve member 17 is axially movable on the stem and is normally urged away from the valve member 16 into engagement with a shoulder 19 on the stem 18 by a helical spring 20 acting between adjacent faces of the valve members 16 and 17. A fitting 21 secured in the lower end of the bore 13 is formed with an axial blind bore 22 forming a guide for the lower free end of the stem 18, which is of reduced diameter. A compression spring 23 acting between the fitting 21 and a radial flange 24 on the stem 18 at the step in diameter below the valve member 17 normally urges the valve member 17 into engagement with the seating 15. Due to the presence of the spring 20 the valve member 16 is held in a position spaced from the seating 14. The inner end of the fitting 21 is formed with an inwardly extending annular projection defining at its free end a seating 25 with which the lower face of the valve member 17 is adapted to engage.

The valve member 16 is carried by a flexible diaphragm 26 which is clamped to the valve member 16 at its inner peripheral edge and, at its outer peripheral edge, is clamped between the upper end of the main housing 12 and a casing 27 provided in its lower face with a recess 28 into which extends a portion of the valve member 16 above the diaphragm 26.

The casing 27 is provided with an open-ended transverse bore 29 provided at an intermediate point in its length with an inwardly projecting annular shoulder 30 of which opposed faces define seatings for adjacent ends of a pair of opposed pistons 31 and 32 which work in the bore 29 and are carried by a rod 33 connected to the bore piece of a solenoid-operated trigger valve 34. Normally a compression spring 35 urges the pistons 31 and 32 in a direction towards the trigger valve 34 in which the piston 32 is in engagement with its seating on the shoulder 30 and the piston 31 is spaced away from its seating due to the engagement of adjacent ends of rods 36 and 37 extending towards each other through a central aperture in the shoulder 30.

The piston 31 is provided in its crown with an inclined passage 38 providing a communication between a chamber 39 defined by the internal edge of the shoulder 30 and the outer end of the portion of the bore 29 in which that piston works and which leads to atmosphere, when the piston 31 is spaced from its seating. The piston 32 is also provided in its crown with an inclined passage 40 which provides communication between the reservoir, which is connected to the outer end of the portion of the bore 29 in which the piston 32 works, and the chamber 39 when the piston 32 is spaced from its seating.

Figure 3:
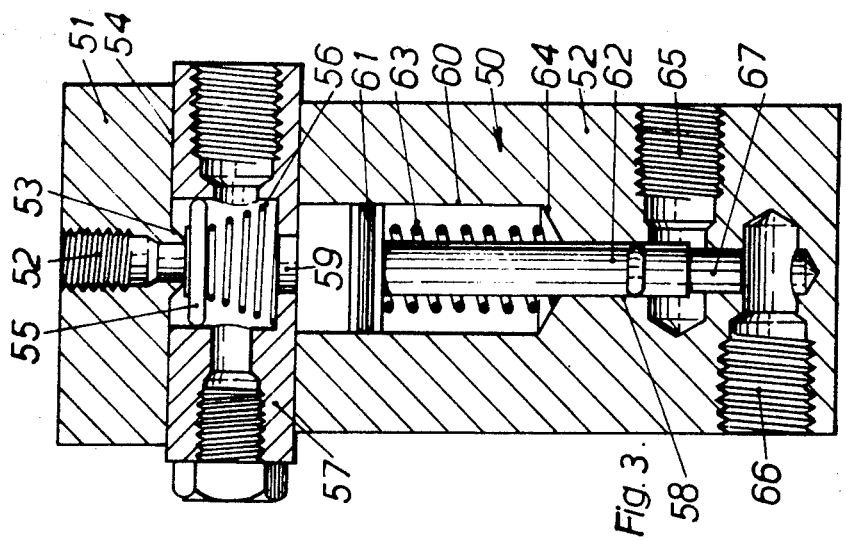
FIG. 3 is a section through a restrictor valve incorporated in the braking system shown in FIG. 1.

The casing 27 is formed with a passage 41 providing communication between the chamber 39 and the recess 28, and a radial passage 42 leading from the recess 28 to a restrictor valve assembly 43 illustrated in FIG. 3.

The housing 12 of the control valve assembly 11 is formed with three radial passages 44, 45 and 46. The passage 44 is located between the seating 14 and the diaphragm 26 and is connected to the treadle valve 2 through the restrictor valve 43; the passage 45 is located between the valve seatings 14 and 15 and is connected to the chamber 8 on one side of the movable wall 10 of the booster 5; and the passage 46 is located between the seatings 15 and 25 and is connected to the chamber 9 on the opposite side of the movable wall 10 of the booster 5. The fitting 21 is formed with a diametral passage 47 communicating with atmosphere.

The solenoid of the solenoid-operated trigger valve 34 is adapted to be energised by an energising current generated by an electric control module 48 in response to signals received from sensors 49 sensing the deceleration of the rear wheels of the vehicle when the brakes are applied and when the deceleration of the rear wheels exceeds a predetermined value.

The restrictor valve assembly 43, illustrated in FIG. 3 comprises housing assembly 50 of which the upper part 51 is provided at one end with an axially extending passage 52 terminating at its inner end in an annular valve seating 53 which leads into a transverse through bore 54 between the housing part 51 and a lower housing part 52. The passage 52 is connected to the radial passage 42 in the casing 27 of the control valve assembly 11 and normally communication between the passage 42 and the bore 54 is cut-off by a valve member 55 urged into engagement with the seating 53 by a compression spring 56. The valve member 55 is guided for movement towards and away from the seating 53 in a valve guide assembly 57 which is housed within the bore 54 and which is connected at one end to a bleed to atmosphere, conveniently a needle valve assembly (not shown).

The other lower part 52 of the housing assembly is formed with a blind axially extending bore 58 which is co-axial with an opening 59 in the valve guide assembly 57, and the bore 58 is counterbored at its outer end to form a portion 60 of enlarged diameter in which works a piston 61. The piston 61 is carried by a piston rod 62 working in the bore 58. Normally the piston 61 and the rod 62 are urged upwardly by a spring 63 acting between the piston 61 and a shoulder 64 at the step in the change in diameter between the bore 58 and the counterbore 60.

A pair of axially spaced radial passages 65 and 66 are provided in the lower part of the housing part 52 and at their inner ends lead into the bore 58. A portion 67 of the piston-rod 62 terminating at its lower end is reduced in diameter to provide a gradual cut-off when the piston-rod 62 is moved downwardly to cut-off communication between the passages 65 and 66. The lowermost passage 66 is connected to the treadle valve 2, and the passage 65 is connected to the passage 44 of the control valve assembly 11.

A one-way valve 68 located in a by-pass line which interconnects the radial passages 65 and 66 of the restrictor valve assembly 43 prevents air by-passing the restrictor valve assembly in a reverse direction.

In operation, upon actuation of the treadle valve 2, normally air under pressure from the reservoir 1 is delivered directly to the booster 3 of the combined booster and master cylinder assembly 4 to actuate the booster and cause the master cylinder to deliver hydraulic fluid under pressure to the slave cylinders 4a of the front wheel brakes. Simultaneously air under pressure is delivered to the booster 5 of the combined booster and master cylinder assembly 6 through the restrictor valve assembly 43 and the control valve assembly 11 to actuate the booster 5 and cause the master cylinder of that assembly 6 to deliver hydraulic fluid under pressure to the slave cylinders 6a of the brakes on the rear wheels of the vehicle. Specifically air from the treadle valve 2 passes through communicating passages 66 and 65 of the restrictor valve assembly 43 to the passage 44 of the control valve assembly 11 from whence it flows to the passage 45 which is connected to the chamber 8 on one side of the movable wall 10 of the booster 5.

When the rate of deceleration of the rear wheels of the vehicle exceeds a predetermined value in the application of the brakes, the solenoid of the solenoid-operated trigger valve 34 is energised in response to an electric current from the control module 48. This advances the core piece of the solenoid which in turn moves the pistons 31 and 32 in the bore 29 in a direction away from the trigger valve 34 so that the piston 32 moves away from, and the piston 31 engages with, their respective seatings on the shoulder 30. Air from the reservoir 1 is then admitted into the recess 28 through the bore 29 and the inclined passage 40 in the piston 32. The pressure of air in the recess 28 acts on the diaphragm 26 to move the valve member 16 downwardly into engagement with the seating 14 to cut-off communication between the passages 44 and 45. Simultaneously the lower valve member 17 is moved out of engagement with the seating 15 and into engagement with the seating 25 at the inner end of the fitting 21 so that the passage 45 is placed in communication with the passage 46. Since the passage 45 is connected to the chamber 8 of the booster 5 and the passage 46 is connected to the chamber 9 on the opposite side of the movable wall 10 the pressures acting on opposite sides of the movable wall are equalised. Thus the actuating force applied to the piston of the master cylinder is relieved which in turn relieves the effort applied to the rear wheel brakes.

The pressure in the recess 28 acts on the valve member 55 of the restrictor valve assembly 43 to move it away from its seating 53 against the force in the spring 56. Air pressure then acts on the piston 61 to move it downwardly against the force in the spring 63, at the same time moving the piston-rod 62 in the same direction to restrict progressively communication between the radial passage 66 and 65. The movement of the piston 61 and the piston-rod 62 continues until communication is cut-off between the passages 66 and 65, and as a consequence between the treadle valve 2 and the control valve assembly 11.

When the deceleration of the rear wheels of the vehicle has been reduced to a value equal to or less than the predetermined value, the solenoid of the solenoid-operated trigger valve 34 is de-energised and the piston 32 again engages with its seating on the shoulder 30 under the influence of the spring 35. The pressure in the recess 28 is then relieved and bleeds to atmosphere through the inclined passage 38 in the piston 31 and the portion of the bore 29 in which the piston 31 works. This results in a gradual reduction in the pressure acting on the valve members 55 of the restrictor valve assembly until the valve member 55 engages with the seating 53 under the influence of the spring 56. The pressure in the counterbore 60 above the piston 61 is reduced by a bleed to atmosphere through the needle valve (not shown) and the piston 61 rises in the counterbore 60 under the influence of the spring 63. Since the piston-rod 62 moves upwardly with the piston 61, communication is again established between the radial passages 65 and 66 so that air under pressure is automatically supplied again from the treadle valve 2 to the passage 44 in the control valve assembly.

During the reduction in the pressure in the recess 28 the valve members 16 and 17 automatically return to their initial positions under the influence of the return springs 20 and 23 in which the valve member 16 is spaced from the seating 14 and the valve member 17 engages with the seating 15. Air pressure is again automatically supplied to the chamber 8 of the booster 5 from the passage 45 in the control valve assembly 11 with the result that the brakes on the rear wheels of the vehicle are re-applied automatically.

When the manual force applied to the treadle valve 2 is relieved, the high pressure air in the system is exhausted to atmosphere through the diametrical passage 47 in the fitting 21.

In a modified construction the slave cylinders may be replaced by actuators of the wedge expander type which are adapted to be actuated by the supply of air from the boosters which operate air pressure responsive means, for example, a piston working in a cylinder bore, or a flexible diaphragm controlling the actuator.

In the embodiment described above a pressure proportioning valve 69 may be interposed in the line between the control valve assembly 11 and the booster 5 to reduce the outlet pressure supplied to the booster 5 in a constant ratio with respect to the inlet pressure applied to the valve 69 from the control valve assembly 11.

In the embodiment described above the restrictor valve 43 is operative to cut-off the supply of air under pressure from the reservoir 1 to the control valve assembly 11 substantially simultaneously with a reduction in the pressure in the recess 28 when the rate of deceleration of the rear wheels of the vehicle exceeds the predetermined value. In a modification the restrictor valve 43 may be adapted to operate sequentially in response to signals received from the control valve assembly 11 by modifying the outline of the piston-rod 62 to provide a delayed cut-off between the radial passages 65 and 66.

We claim:

1. A booster-assisted pressure-operated braking system comprising at least one actuator for applying a wheel brake, a booster incorporating a housing, a wall movable in said housing in response to differential fluid pressures applied to chambers in said housing on opposite sides of said movable wall to operate said actuator, a first supply of fluid under pressure, a second supply of fluid under pressure, a control valve assembly which is normally open to supply fluid under pressure from said first supply to a chamber in said housing on one side of said movable wall whereby said movable wall is moved in one direction to actuate said actuator, and deceleration responsive means responsive to the deceleration of a wheel braked by said wheel brake to apply to said control valve assembly, when the deceleration of the braked wheel exceeds a predetermined value, said second supply of fluid under pressure which is adapted to cause said control valve assembly to place the chamber on the opposite side of said movable wall in communication with said first supply of fluid under pressure whereby said movable wall is restored to a position in which the pressure applied to the booster is relieved.

2. A booster-assisted fluid pressure-operated braking system as claimed in claim 1, wherein there is interposed between said first supply of fluid under pressure and said control valve assembly a restrictor valve assembly which is normally open to allow fluid under pressure to be supplied to said control valve assembly and means are incorporated for subjecting said restrictor valve assembly to said second supply of fluid under pressure, when the deceleration of said braked wheel exceeds said predetermined value whereby said restrictor valve assembly is operative to regulate communication between said supply of fluid under pressure and said control valve assembly.

3. A booster-assisted fluid pressure-operated braking system as claimed in claim 2, wherein said restrictor valve assembly is operative to restrict progressively communication between said supply of fluid under pressure and said control valve assembly simultaneously with closure of said control valve assembly, and said means comprise a passage connecting said control valve assembly to said restrictor valve assembly, 4. A booster-assisted fluid pressure-operated braking system as claimed in claim 2, wherein said restrictor valve is operative to restrict progressively communication between said supply of fluid under pressure and said control valve assembly after a predetermined delay following closure of said control valve assembly.

5. A booster-assisted fluid pressure-operated braking system as claimed in claim 1, wherein said deceleration responsive means comprise a sensor for sensing the deceleration of said braked wheel, a solenoid-operated trigger valve for closing said control valve assembly, and an electronic control module which receives signals from said sensor and which is operative to energise the solenoid of said trigger valve when the deceleration of said braked wheel exceeds said predetermined value.

6. A booster-assisted pressure-operated braking system comprising at least one actuator for applying a wheel brake, a booster incorporating a housing, a wall movable in said housing in response to differential fluid pressure applied to chambers in said housing on opposite sides of said movable wall to operate said actuator, a supply of fluid under pressure, a control valve assembly which is normally open to supply fluid under pressure from said supply to a chamber in said housing on one side of said movable wall whereby said movable wall is moved in one direction to actuate said actuator, and deceleration responsive means responsive to the deceleration of a wheel braked by said wheel brake to close said control valve when the deceleration of the braked wheel exceeds a predetermined value and to cause said control valve to place the chamber on the opposite side of said movable wall in communication with said supply of fluid under pressure, whereby said movable wall is restored to a position in which the pressure applied to the booster is relieved, wherein said control valve assembly comprises a housing having a first inlet passage connected to said supply of fluid under pressure, a first outlet passage connected to the chamber on the said one side of said movable wall, a second outlet passage connected to the chamber on the said opposite side of said movable wall, a first valve member in said housing for engagement with a first seating between said first inlet passage and said first outlet passage, a second valve member in said housing for alternative engagement with one of a pair of axially spaced second and third seatings located respectively between said first inlet passage and said first outlet passage, and between said first outlet passage and said second outlet passage, a coupling between said first and second valve members, spring means normally urging said first valve member away from said first seating and said second valve member into engagement with said second seating whereby said fluid from said supply is delivered to said chamber on said one side of said movable wall through said first inlet passage and said first outlet passage, a flexible diaphragm carrying said first valve member, a normally closed valve for controlling communication between said supply of fluid under pressure and a chamber in said housing on the side of said flexible diaphragm remote from said second valve member, and means for opening said valve when the deceleration of the braked wheel exceeds said predetermined value so that fluid from said supply of pressure fluid enters said chamber and acts on said diaphragm in opposition to said spring means to urge said first valve member into engagement with said first seating to cut-off communication between said first inlet passage and first outlet passage, and then urge said second valve member away from said second seating to place said first and second outlet passages in communication and equalise the pressure acting on opposite sides of said movable wall.

7. A booster-assisted fluid pressure-operated braking system as claimed in claim 6, wherein said second valve member is mounted on an axial extension of said first valve member and is urged into engagmeent with an abutment on said extension by a first spring acting between said valve members, and a second spring acts between said extension and said housing to urge said first valve member away from said first seating and said second valve member into engagement with said second seating.

8. A booster-assisted fluid pressure-operated braking system as claimed in claim 6, wherein said valve comprises a first piston working in a bore connected at one end to said supply of fluid under pressure, and a spring normally urges said first piston into a closed position in which the inner end of said first piston engages with an annular seating in said bore, a radial passage in said wall of the housing on the side of the seating remote from said piston providing communication between said bore and said chamber, 9. A booster-assisted fluid pressure-operated braking system as claimed in claim 8, wherein a rod extending through said seating with which said first piston engages acts on said inner end of said piston, and wherein a solenoid-operated trigger valve, of which the solenoid is energised when the deceleration of said braked wheel exceeds a predetermined value, incorporates a core-piece coupled to said rod and adapted to be advanced to cause said first piston to move away from its seating when said solenoid is energised.

10. A booster-assisted fluid pressure-operated braking system as claimed in claim 9, wherein said annular seating is formed by one end of an annular shoulder located at an intermediate point in the length of said bore and a second piston working in the portion of said bore located between said shoulder and the free end of the bore remote from said end connected to said supply of fluid under pressure has an inner end for engagement with a seating defined by an opposite face of said shoulder, a spring acting on said first piston normally urging said second piston away from its seating so that said chamber above said diaphragm is in communication with atmosphere through said radial passage, and said second piston being urged into engagement with its seating when said solenoid is energised whereby said chamber is placed in communication with said supply of fluid under pressure.

11. A booster-assisted fluid pressure-operated braking system as claimed in claim 10, wherein each piston is of cup-shaped outline having a crown incorporating a passage which provides communication between portions of said bore at opposite ends of that piston at a position radially outwards from a radially innermost edge of said seating on said shoulder with which that piston is adapted to engage.

12. A booster-assisted fluid pressure-operated braking system as claimed in claim 6, wherein said first inlet passage is connected to said supply of fluid under pressure through a restrictor valve assembly adapted to regulate communication between said supply of fluid under pressure and said control valve assembly when said deceleration of said braked wheel exceeds said predetermined value.

13. A booster-assisted fluid pressure-operated braking system as claimed in claim 12, wherein said restrictor valve assembly comprises a housing having a first radial passage connected to said supply of fluid under pressure and a second radial passage communicating with said first radial passage through a longitudinally extending bore in said housing and connected to said first inlet passage of said control valve assembly, a piston rod working in the longitudinally extending bore being adapted to control communication between said first and second radial passages in response to changes in the pressure of fluid applied to said chamber in the control valve assembly above the diaphragm.

14. A booster-assisted fluid pressure-operated braking system as claimed in claim 13, wherein a portion at the end of said longitudinally extending bore remote from said radial passage is counterbored and a piston working in said counterbore and carried by said piston-rod is exposed to pressure in said control chamber to advance said piston-rod in said bore and regulate communication between said first and second radial passages, and normally a return spring acting between said piston and a shoulder at a step in diameter between said bore and said counterbore is adapted to urge said piston in an opposite direction into a retracted position in which said radial passages are in free communication.

15. A booster-assisted fluid pressure-operated braking system as claimed in claim 13, wherein a normally closed valve is adapted to control communication between said chamber in said control valve assembly and said piston-rod, and said normally closed valve is adapted to open when the pressure in said control chamber exceeds a predetermined value.

16. A booster-assisted fluid pressure-operated braking system as claimed in claim 15, wherein said normally closed valve comprises a valve member guided in a valve guide for axial movement relative to a seating surrounding an inlet connected to said chamber in said control valve assembly, and a spring for normally urging said valve member into engagement with said seating, said valve guide incorporating a radial outlet passage having a restriction through which fluid under pressure can escape gradually from said restrictor valve assembly when said valve member is moved away from its seating.

17. A booster-assisted fluid pressure-operated braking system as claimed in claim 13, wherein said radial passages are spaced axially from each other along a length of said longitudinally extending bore are are separated at adjacent ends by a bore portion in which works a free end portion of said piston-rod.

18. A booster-assisted fluid pressure-operated braking system as claimed in claim 17, wherein said free end portion is reduced in diameter to provide communication between said radial passages when said piston-rod is in a normal retracted position, and a full diameter of said piston rod inwardly of said reduced diameter portion is adapted to enter said bore portion when said piston-rod is advanced in said longitudinally extending bore.

* * * * *